United States Patent
Tiedemann, Jr. et al.

(10) Patent No.: US 6,304,755 B1
(45) Date of Patent: Oct. 16, 2001

(54) METHOD AND APPARATUS FOR PERFORMING MOBILE ASSISTED HARD HANDOFF BETWEEN COMMUNICATION SYSTEMS

(75) Inventors: Edward G. Tiedemann, Jr.; Tao Chen, both of San Diego; Charles E. Wheatley, III, Del Mar, all of CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/307,878

(22) Filed: May 10, 1999

Related U.S. Application Data

(63) Continuation of application No. 08/784,280, filed on Jan. 15, 1997, now Pat. No. 5,940,761.

(51) Int. Cl.[7] ............................................. H04Q 7/38
(52) U.S. Cl. ........................ 455/437; 455/438; 455/525; 455/552; 370/332
(58) Field of Search ........................... 455/437, 438, 455/426, 510, 524, 525, 422, 436, 552; 370/331, 332, 328; 375/130

(56) References Cited

U.S. PATENT DOCUMENTS

| | | | |
|---|---|---|---|
| 4,901,307 | 2/1990 | Gilhousen et al. | 370/18 |
| 5,101,501 | 3/1992 | Gilhousen et al. | 455/33 |

(List continued on next page.)

FOREIGN PATENT DOCUMENTS

| | | | |
|---|---|---|---|
| 0406186 | 5/1990 | (EP) | H04Q/7/04 |
| 0421535 | 10/1990 | (EP) | H04Q/7/04 |
| 9616524 | 5/1996 | (WO) . | |

OTHER PUBLICATIONS

TIA Document "CDMA Intersystem Operations" by Alejandro Holcman, et al. Presented at IEEE Conference on Vehicular Technology Committee, Stockholm, Sweden Jun. 8, 1994.

TIA TR45.2 Intersystems Operations Presentation "The Wideband Spread Spectrum Standard Under Development in TR45.5" by Edward G. Tiedemann, Presented in Atlanta, GA Nov. 16, 1992–Nov. 20, 1992.

(List continued on next page.)

*Primary Examiner*—William Trost
*Assistant Examiner*—Philip J. Sobutka
(74) *Attorney, Agent, or Firm*—Philip R. Wadsworth; Kent D. Baker; Byron Yafuso

(57) ABSTRACT

A method and apparatus for performing inter-system hard handoff between communication systems or inter-frequency hard handoff within a CDMA communication system is disclosed. The purpose of this invention is to reduce the probability of dropped calls during inter-system hard handoff. In the event that a hard handoff attempt is unsuccessful, the mobile station will return to the original system with information which the communication system of the present invention uses to assist in the performance of future handoff attempts. Alternatively, with no handoff attempt made, the mobile station monitors the destination system then returns to the original system with information used to assist in subsequent handoff attempts. The information returned from monitoring a CDMA system consists of results of a search for one or more pilots given at offsets in a specific list provided to the mobile station by the base station or a set of offsets based upon a predetermined search algorithm.

29 Claims, 4 Drawing Sheets

U.S. PATENT DOCUMENTS

| | | |
|---|---|---|
| 5,261,117 | 11/1993 | Olson .................................... 455/510 |
| 5,267,261 | 11/1993 | Blakeney, II et al. .................... 375/1 |
| 5,293,641 | 3/1994 | Kallin et al. .......................... 455/510 |
| 5,293,643 | 3/1994 | Israelsson ............................ 455/33.2 |
| 5,295,153 | 3/1994 | Gudmundson ........................... 375/1 |
| 5,327,575 | 7/1994 | Menich et al. ....................... 455/33.2 |
| 5,428,816 | 6/1995 | Barnett et al. ....................... 455/33.2 |
| 5,471,670 | 11/1995 | Hess et al. ............................ 455/437 |
| 5,487,065 | 1/1996 | Acampora et al. ................... 455/437 |
| 5,594,718 * | 1/1997 | Weaver, Jr. et al. ................. 370/331 |
| 5,594,949 | 1/1997 | Andersson et al. .................... 455/62 |
| 5,640,414 | 6/1997 | Blakeney, II et al. ............... 375/200 |
| 5,640,679 | 6/1997 | Lundqvist et al. .................. 455/33.2 |
| 5,649,000 | 7/1997 | Lee et al. ............................. 455/436 |
| 5,673,307 | 9/1997 | Holland et al. ...................... 455/437 |
| 5,701,585 | 12/1997 | Kallin et al. ........................ 455/33.2 |
| 5,722,073 | 2/1998 | Wallstedt et al. .................... 455/437 |
| 5,848,063 * | 12/1998 | Weaver, Jr. et al. ................. 370/331 |
| 5,926,470 * | 7/1999 | Tiedemann, Jr. ..................... 370/334 |
| 5,940,761 * | 8/1999 | Tiedemann, Jr. et al. ........... 455/437 |

OTHER PUBLICATIONS

TIA Document "Intersystem Operation with the Proposed Wideband Spread Spectrum Dual–Mode Station–Base Station Compatibility Standard" by Gadi Karmi, et al., Presented in Atlanta, GA, May 1992.

TIA Document "Soft Handoff Frame Format" by Edward Tiedemann, Jr. Dec. 11–14, 1995, pp. 1–7.

TIA Document "Alternative Methods for Inter–Channel Handoff" by Charles Wheatley, Nov. 10–20, 1992, pp. 1–3.

TIA Document "Proposed Draft Liaison Statement to TR.45.2" by Edward Tiedemann, Jr., Dec. 3–11, 1992, pp. 1–32.

TIA Document "Intersystem Issues for Support of the Wideband Spread–Spectrum Digital Standard" by Gadi Karmi, Oct. 6, 1992, pp. 1–7.

TIA/EIA Telecommunications Systems Bulletin, Cellular Radiotelecommunications Intersystem Operations: Authentication, Signaling Message Encryption and Voice Privacy, May 1993.

EIA/TIA Interim Standard "Cellular Radiotelecommunications Intersystem Operations: Intersystem Handoff" Dec., 1991.

TIA/EIA Telecommunications Systems Bulletin "IS–41–B Mobile Border System Problems" Apr., 1994.

TIA/EIA Telecommunications Systems Bulletin "IS–41–B Support for Dual Mode Wideband Spread Spectrum Mobile Stations" Jan., 1994.

* cited by examiner

MOBILE STATION

METHOD AND APPARATUS FOR PERFORMING MOBILE ASSISTED HARD HANDOFF BETWEEN COMMUNICATION SYSTEMS

This is a continuation of application Ser. No. 08/784,280, filed Jan. 15, 1997, now U.S. Pat. No. 5,940,761.

BACKGROUND OF THE INVENTION

I. Field of the Invention

The present invention relates to communications systems. More particularly, the present invention relates to a novel and improved method for hard handoff between different wireless communication systems.

II. Description of the Related Art

In a code division multiple access (CDMA) spread spectrum communication system, a common frequency band is used for communication with all base stations within that system. An example of such a system is described in the TIA/EIA Interim Standard IS-95-A entitled "Mobile Station-Base Station Compatibility Standard for Dual-Mode Wideband Spread Spectrum Cellular System", incorporated herein by reference. The generation and receipt of CDMA signals is disclosed in U.S. Pat. No. 4,401,307 entitled "SPREAD SPECTRUM MULTIPLE ACCESS COMMUNICATION SYSTEMS USING SATELLITE OR TERRESTRIAL REPEATERS" and in U.S. Pat. No. 5,103,459 entitled "SYSTEM AND METHOD FOR GENERATING WAVEFORMS IN A CDMA CELLULAR TELEPHONE SYSTEM" both of which are assigned to the assignees of the present invention and incorporated herein by reference.

Signals occupying the common frequency band are discriminated at the receiving station through the spread spectrum CDMA waveform properties based on the use of a high rate pseudonoise (PN) code. A PN code is used to modulate signals transmitted from the base stations and the remote stations. Signals from different base stations can be separately received at the receiving station by discrimination of the unique time offset that is introduced in the PN codes assigned to each base station. The high rate PN modulation also allows the receiving station to receive a signal from a single transmission station where the signal has traveled over distinct propagation paths. Demodulation of multiple signals is disclosed in U.S. Pat. No. 5,490,165 entitled "DEMODULATION ELEMENT ASSIGNMENT IN A SYSTEM CAPABLE OF RECEIVING MULTIPLE SIGNALS" and in U.S. Pat. No. 5,109,390 entitled "DIVERSITY RECEIVER IN A CDMA CELLULAR TELEPHONE SYSTEM", both of which are assigned to the assignee of the present invention and incorporated herein by reference.

The common frequency band allows simultaneous communication between a remote station and more than one base station, a condition known as soft handoff disclosed in U.S. Pat. No. 5,101,501 entitled "SOFT HANDOFF IN A CDMA CELLULAR TELEPHONE SYSTEM" and U.S. Patent No. 5,267,261 entitled "MOBILE STATION ASSISTED SOFT HANDOFF IN A CDMA CELLULAR COMMUNICATIONS SYSTEM", both assigned to the assignee of the present invention and incorporated herein by reference. Similarly, a remote station can be simultaneously communicating with two sectors of the same base station, known as softer handoff as disclosed in U.S. Pat. No. 5,625,876 entitled "METHOD AND APPARATUS FOR PERFORMING HANDOFF BETWEEN SECTORS OF A COMMON BASE STATION", issued Apr. 29, 1997, assigned to the assignee of the present invention and incorporated herein by reference. Handoffs are described as soft and softer because they make the new connection before breaking the existing one.

If a mobile station travels outside the boundary of the system with which it is currently communicating, it is desirable to maintain the communication link by transferring the call to a neighboring system, if one exists. The neighboring system may use any wireless technology, examples of which are CDMA, NAMPS, AMPS, TDMA or FDMA. If the neighboring system uses CDMA on the same frequency band as the current system, an inter-system soft handoff can be performed. In situations where intersystem soft handoff is not available, the communication link is transferred through a hard handoff where the current connection is broken before a new one is made. Examples of hard handoffs are those from a CDMA system to a system employing an alternate technology or a call transferred between two CDMA systems which use different frequency bands (inter-frequency hard handoff).

Inter-frequency hard handoffs can also occur within a CDMA system. For example, a region of high demand such as a downtown area may require a greater number of frequencies to service demand than the suburban region surrounding it. It may not be cost effective to deploy all available frequencies throughout the system. A call originating on a frequency deployed only in the high congestion area must be handed off as the user travels to a less congested area. Another example is that of a microwave or other service operating on a frequency within the system's boundaries. As users travel into an area suffering from interference from the other service, their call may need to be handed off to a different frequency.

Handoffs can be initiated using a variety of techniques. Handoff techniques, including those using signal quality measurements to initiate handoff, are found in U.S. Pat. No. 5,697,055 entitled "METHOD AND APPARATUS FOR HANDOFF BETWEEN DIFFERENT CELLULAR COMMUNICATIONS SYSTEMS", issued Dec. 9, 1997, assigned to the assignee of the present invention and incorporated herein by reference. Further disclosure on handoffs, including measurement of round-trip signal delay to initiate handoff, is disclosed in U.S. Pat. No. 5,848,063 entitled "METHOD AND APPARATUS FOR HARD HANDOFF IN A CDMA SYSTEM", issued Dec. 8, 1998, assigned to the assignee of the present invention and incorporated herein by reference. Handoffs from CDMA systems to alternate technology systems are disclosed in U.S. Pat. No. 5,594,718 ('718 patent) entitled "METHOD AND APPARATUS FOR MOBILE UNIT ASSISTED CDMA TO ALTERNATIVE SYSTEM HARD HANDOFF", issued Jan. 14, 1997, assigned to the assignee of the present invention and incorporated herein by reference. In the '708 patent, pilot beacons are placed at the boundaries of the system. When a mobile station reports these pilots to the base station, the base station knows that the mobile station is approaching the boundary.

When a system has determined that a call should be transferred to another system via hard handoff, a message is sent to the mobile station directing it to do so along with parameters that enable the mobile station to connect with the destination system. The system has only estimates of the mobile station's actual location and environment, so the parameters sent to the mobile station are not guaranteed to be accurate. For example, with beacon aided handoff, the measurement of the pilot beacon's signal strength can be a valid criteria for triggering the handoff. However, the appropriate cell or cells in the destination system which are to be assigned to the mobile station (known as the Active Set) are not necessarily known. Moreover, including all the likely possibilities may exceed the maximum allowable in the Active Set.

In order for the mobile station to communicate with the destination system, it must lose contact with the old system. If the parameters given to the mobile station are not valid for any reason, i.e. changes in the mobile station's environment or lack of precise location information at the base station, the new communication link will not be formed, and the call may be dropped. After an unsuccessful handoff attempt, the mobile station can revert back to the previous system if it is still possible to do so. With no further information and no significant change in the mobile station's environment, repeated attempts to hand off will also fail. Thus, there is a need felt in the art for a method for performing additional hard handoff attempts with greater probability of success.

SUMMARY OF THE INVENTION

The purpose of this invention is to reduce the probability of dropped calls during inter-system hard handoff. In the event that a hard handoff attempt is unsuccessful, the mobile station will return to the original system with information which the communication system of the present invention uses to assist in the performance of future handoff attempts.

Prior to handoff, the original base station will have a rough estimate of the most likely base stations of a destination system to provide service to a mobile station as it travels into the destination system. In the exemplary embodiment, a message will be sent from the base station to the mobile station containing this list of neighboring base stations in the destination system, a minimum total received power threshold, and a minimum pilot energy threshold. When the base station in the original system has determined that a hard handoff is appropriate, it signals the neighboring base stations in the destination system to begin transmitting forward link traffic to the mobile station entering the system. A first hard handoff is attempted after a message is received by the mobile station from the base station initiating the inter-system hard handoff. The mobile station switches to the frequency of the destination system and attempts to acquire the base stations of the destination system in accordance with the acquisition parameters provided (i.e. the pilot PN offsets). If the minimum pilot energy threshold is exceeded, the handoff is deemed to be successful and the mobile station remains on the destination system.

If the minimum pilot energy threshold is not exceeded, recovery techniques begin. The mobile station measures the total in-band energy of the destination system and compares that to the total received power threshold. If the minimum total received power threshold is not exceeded, the handoff is abandoned immediately. The mobile station returns to the original system and reports that no significant power was detected at the new frequency. If the minimum total received power is exceeded, it is likely that the destination system is available, but that the neighboring base stations provided by the original system (referred to as the new Active Set) is not acceptable for communication. The mobile station then performs a search to locate viable pilot signals in the destination system. In general, a list of offsets to search provided to the mobile station will be sufficient to locate available pilots, although other search algorithms can be employed. Upon completion of the search, the mobile station returns to the original system and reports the failure and any pilot signals found in the search which exceeded a third threshold.

If no significant received power was detected or there were no pilots found in the search, the system controller can opt to delay a second attempt at handoff in hopes of a beneficial change in the mobile station's environment. In the alternative, the mobile station can abandon the hard handoff attempt altogether, which would likely result in the eventual dropping of the call. However, in those cases where the destination system is present, the system controller can update the Active Set based on the returned search information, and the destination system can modify the base stations transmitting to the mobile station accordingly. Then a second hard handoff attempt message can be sent to the mobile station. Unless the environment has changed, this second attempt is likely to be successful.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

Figure 1:
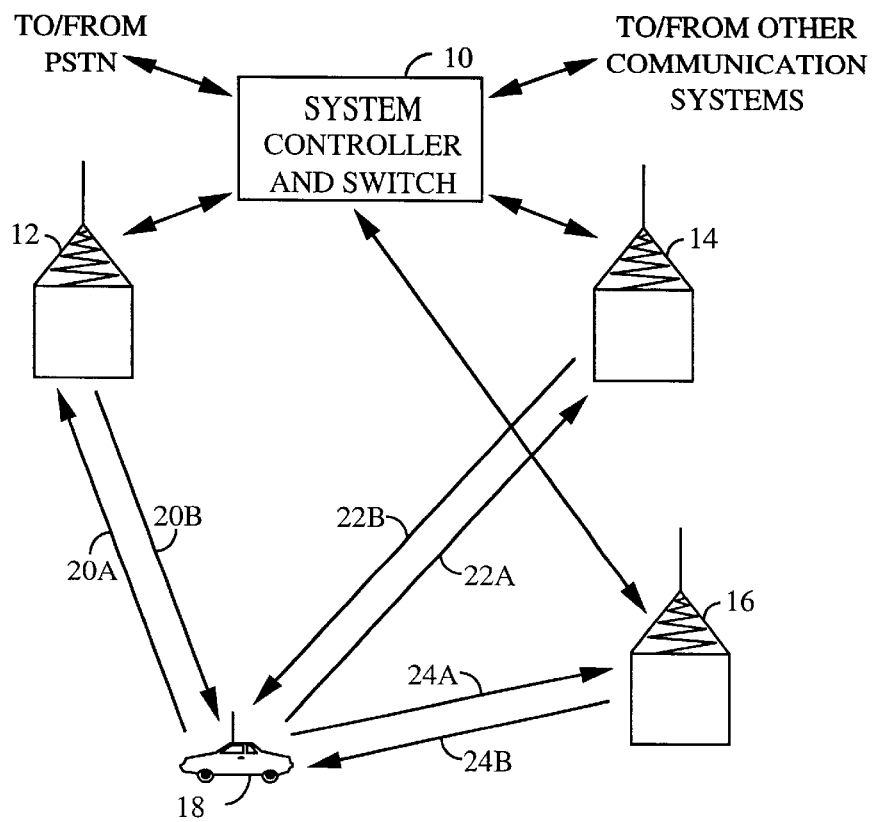
FIG. 1 is a schematic overview of an exemplary spread spectrum CDMA communications system in accordance with the present invention.

FIG. 1 depicts an embodiment of a communication system employing the present invention. A typical CDMA communications system consists of a system controller and switch 10 in communication with one or more base stations, examples of which are 12, 14, and 16. System controller and switch 10 also connects with the Public Switched Telephone Network (PSTN) (not shown) and with other communication systems (not shown). Mobile station 18 is an example subscriber with forward links 20B, 22B, and 24B, and reverse links 20A, 22A, and 24A. The system controller and switch 10 controls soft handoffs and inter-frequency hard handoffs within the system, and in conjunction with neighboring systems controls inter-system soft handoff as well as inter-system hard handoffs. The exemplary embodiment of the present invention deals with CDMA system to CDMA system interfrequency hard handoffs. It will be understood by one skilled in the art that the teachings of the present invention can be applied to handoffs using multiple access schemes and for handoff between systems using different modulation schemes.

Figure 2:
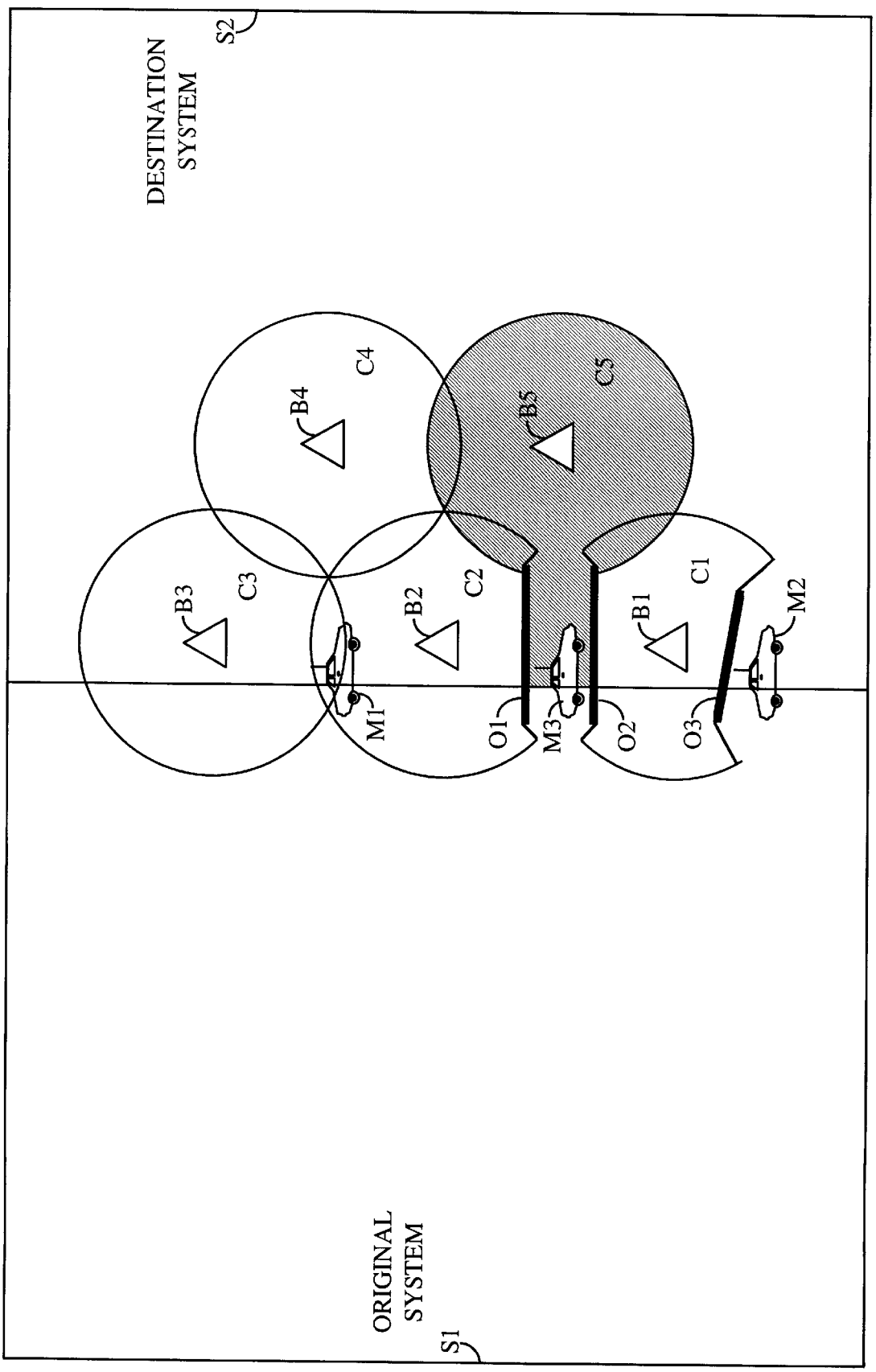
FIG. 2 is a representation of example scenarios whereby the various situations responded to by this invention can be described.

FIG. 2 depicts three different scenarios possible in the use of the present invention. Three mobile stations, M1, M2, and M3 are traveling from the system where their respective calls originated, S1, to a neighboring system of differing frequency, S2. Initially, all the mobile stations M1–M3 are in communication with one or more base stations (not shown) in system S1. As each mobile station travels across the boundary of S1 into S2, a hard handoff attempt will be made. The destination system, S2, contains base stations B1–B5 each which cover a cell area C1–C5, respectively.

System S2 may have other base stations (not shown) which do not affect the scenarios given. As shown, some cells intersect with other cells. In that overlapping region, a mobile station can be in communication with either base station or both simultaneously if the mobile station is in soft handoff. Also shown are obstructions O1–O3. These obstructions distort the coverage areas that otherwise would be circular shaped cells. Cell C5 is shown shaded to clearly indicate its unusual shape.

Consider first mobile station M1. This is an example of a case which would result in a successful hard handoff in both the state of the art and the current invention. As M1 approaches the S1–S2 border, origination system S1 predicts the likely neighbors in destination system S2, based on its best guess of the location of M1. S1, through a base station in contact with M1 (not shown) then notifies M1 of the PN offsets of cells in the destination system S2, for example C1, C2, C3, C4, and C5. In the exemplary embodiment, S2 also sends parameters for minimum total received pilot, MIN_TOT_PILOT, and minimum received power, MIN_RX_PWR. In an alternative embodiment, M1 may store values of MIN_TOT_PILOT and MIN_RX_PWR or may be capable of generating the values based on system data. S1 then begins forwarding traffic to system S2 with instructions to set up the appropriate forward link for that data directed to mobile station M1 on base stations B2 and B3. Base stations B2 and B3 are the most likely target base stations and are in the new Active Set. Then S1 sends an initiation message to mobile station M1 to begin the hard handoff process. Owing to the benign propagation environment in the vicinity of mobile station M1, when M1 switches to the new frequency, it will find the pilots and successfully demodulate forward link traffic from the new Active Set, base stations B2 and B3, as predicted by system S1. M1 determines the hard handoff to be successful because the total received pilot exceeds the threshold MIN_TOT_PILOT. System S1 will deallocate resources previously assigned to communicate with mobile station M1 after it is determined that the hard handoff was successful. This determination may be made by receipt of a message from system S2, or based on a prearranged time duration in which no further communication takes place between system S1 and mobile station M1.

Next, consider mobile station M2, which is in an area of inadequate coverage by S2 often referred to as a hole. As mobile station M2 approaches the S1–S2 border, system S1 predicts that coverage in system S2 is provided in cell C1. The handoff is initiated in the same manner as described above. However, upon switching to the frequency of destination system S2, significant signal energy is not received by mobile station M2 due to the interference caused by obstruction O3. That is, total received pilot is less than the threshold MIN_TOT_PILOT. In current systems, this call would be dropped. In the present invention, the mobile station begins recovery techniques.

Once the mobile station determines that the pilot or pilots predicted by S1 are not available, M2 measures the total received power in the new frequency band and compares it to threshold MIN_RX_PWR. In this example, the only transmitter near M2 is base station B1 and its signal is blocked by obstruction O3, so no significant energy is found in the frequency band of the destination system. Mobile station M2 then abandons the handoff and returns to system S1, notifying it that no system S2 was found. Assume mobile station M2 continues traveling away from system S1. Since the call was not dropped, as would have been the case using current methods, a number of options exist. At minimum, the call can continue on system S1 until it eventually drops because the distance has become too great. Given that the mobile station environment is susceptible to change, a second handoff attempt after a delay may be successful.

Finally, consider mobile station M3. In like manner to mobile stations M1 and M2 handoff procedures are initiated with cells C1 and C2 being the predicted new Active Set. Due to obstructions O1 and O2, neither predicted cell is available to mobile station M3, hence MIN_TOT_PILOT is not exceeded. Again recovery procedures begin. This time base station BS is within range, however its offset is not in the new Active Set, nor is it transmitting forward link data directed to M3. As such, although the predicted cells are not available, the minimum received power threshold, MIN_RX_PWR, is exceeded. In the exemplary embodiment of the present invention, since the system appears to be available, a search for available pilots is performed. When the search is complete, mobile station M3 returns to system S1 and notifies it of the failed handoff attempt as well as the available pilots, in this case the pilot for cell C5. In the present invention, S1 sends a message to destination system S2 to set up a forward link on base station BS, then a second attempt at handoff can be made. If the environment has not changed substantially, the second time M3 switches to the new frequency, the call will successfully hand off to base station B5 of destination system S2.

Figure 3:
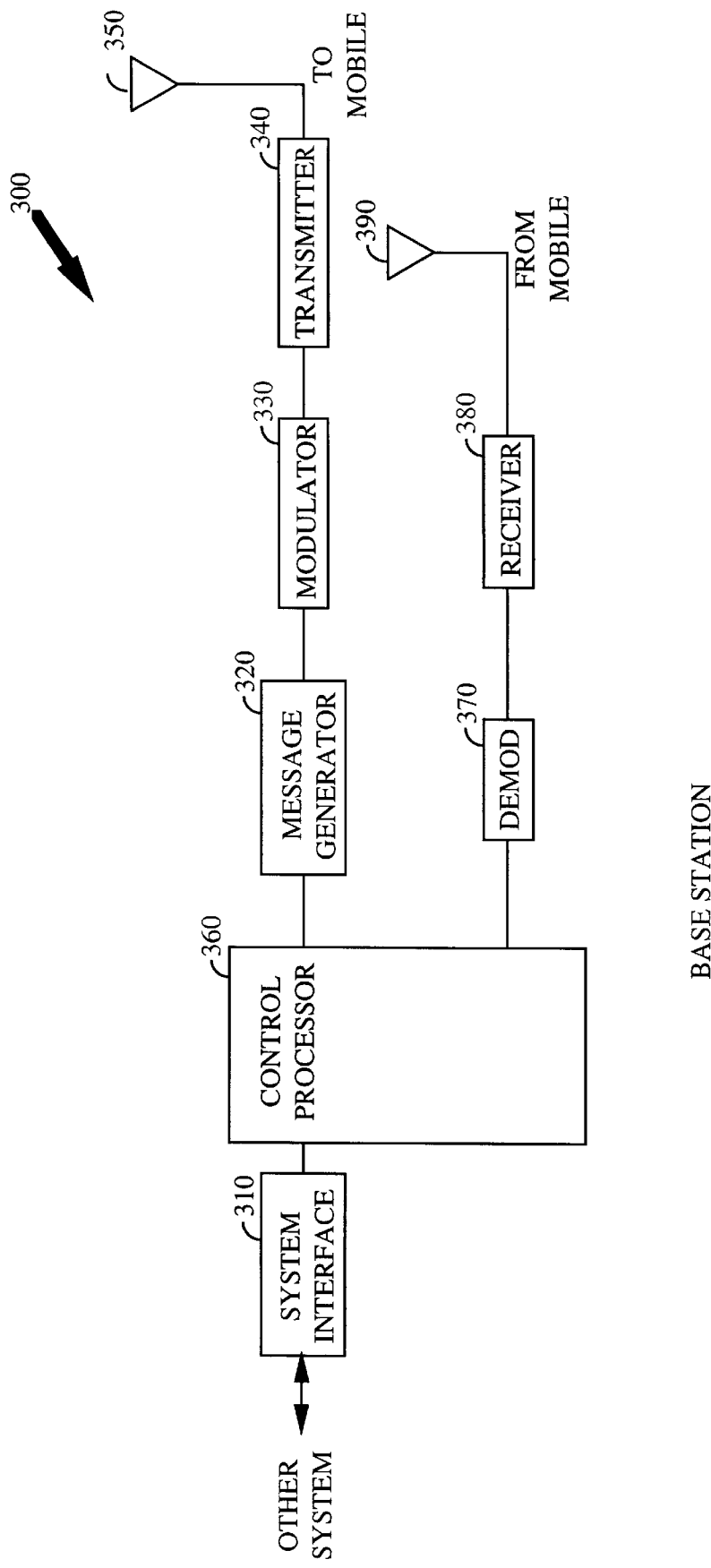
FIG. 3 is an illustration of an exemplary base station.

FIG. 3 depicts an exemplary base station. Base station 300 communicates with other systems (not shown) and with system controller and switch 10, shown in FIG. 1, through system interface 310. Interfrequency handoff is a distributed process, with system controller and switch 10 signaling with the other switch, and base station 300 handling some of the handoff details. System controller 10 determines, in conjunction with base station 300, that an inter-system hard handoff is necessary. There are many alternatives for handoff determination as described above, including mobile station location or pilot beacon reception. The destination system (not shown) is instructed by the origination system to begin transmitting forward link traffic on the destination system's frequency from a select set of base stations. A database (not shown) in control processor 360 may contain the candidate base stations. Alternatively, a suitable list of handoff base station candidates can be returned from the destination system to control processor 360 through system interface 310. In situations where the destination system is not a CDMA system, other parameters useful for acquiring the destination system can be delivered to control processor 360 through system interface 310.

Parameters and instructions from control processor 360 are formed into messages in message generator 320. Those messages are modulated in modulator 330 and sent to the mobile station through transmitter 340 and antenna 350. In the exemplary embodiment, modulator 330 is a CDMA modulator as described in the aforementioned U.S. Pat. Nos. 4,901,307 and 5,103,459. In the exemplary embodiment, the list of neighbor base stations, MIN_TOT_PILOT, and MIN_RX_PWR are combined into a single message, referred to herein as the Other Frequency Neighbor List Message (OFNLM). The base station to mobile station message that signals the mobile station to begin attempting to acquire the destination system contains the destination system Active Set and is called the Extended Handoff Direction Message (EHDM). Additional parameters are envisioned that could be sent to the mobile station to facilitate improved hard handoff in the event of a handoff attempt failure. For example, a specific list of offsets to search, a range of offsets to search, or a specific search algorithm such as-searching offsets in increments of 64 chips away from those offsets attempted from those of the base stations listed in the OFNLM.

Following a failed hard handoff attempt, the mobile station will follow the instructions as given, then return to the original system to communicate its findings. Reverse link signals from the mobile station to base station 300 are received through antenna 390, downconverted in receiver 380, and demodulated in demodulator 370 under control of control processor 360.

Figure 4:
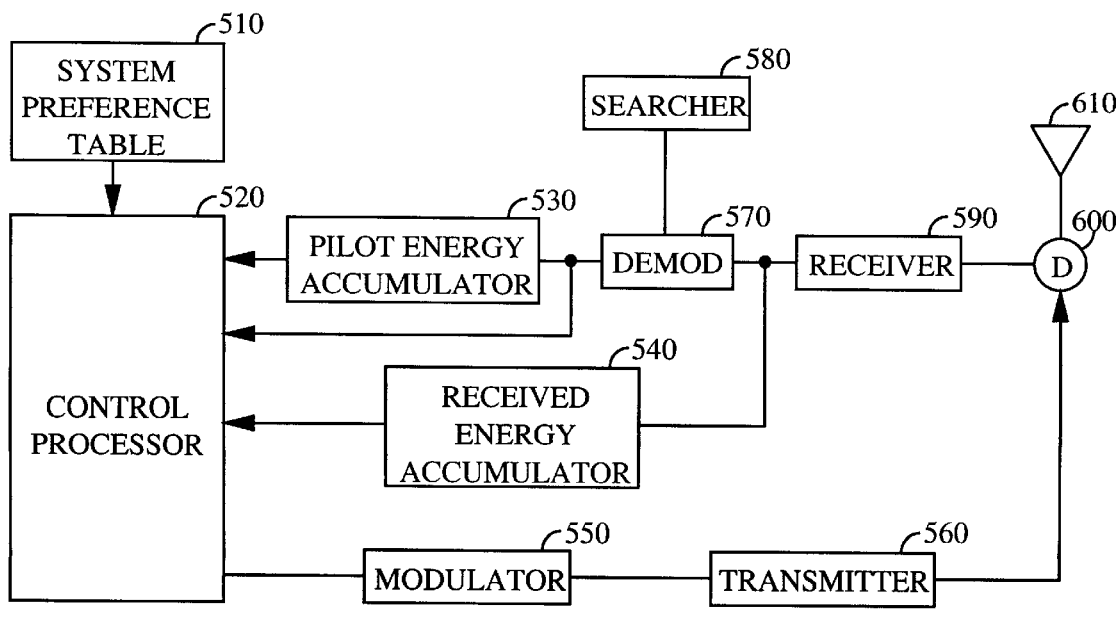
FIG. 4 is an illustration of an exemplary mobile station.

FIG. 4 depicts an exemplary mobile station 500. Messages arrive at control processor 520 from base station 300 through antenna 610, duplexer 600, receiver 590 and demodulator 570. In the exemplary embodiment, receiver 590 is a CDMA modulator as described in the aforementioned U.S. Pat. Nos. 4,901,307 and 5,103,459. Upon receipt of the EHDM message from base station 300, control processor 520 directs receiver 590 and transmitter 560 to tune to the frequency of the destination. At this point, the communication link with the original system has been broken. Control processor 520 directs demodulator 570 to attempt to demodulate pilots at the offsets in the Active Set as given by base station 300 in the EHDM. The energy in the signals demodulated with those offsets is accumulated in pilot energy accumulator 530. Control processor 520 uses the results of the accumulation to compare to MIN_TOT_PILOT. If MIN_TOT_PILOT is exceeded, the handoff is deemed successful. If MIN_TOT_PILOT is not exceeded, recovery operations begin. Alternatively, a requirement of receiving some number N good frames (no CRC errors) within a specific time T can be used to determine if the handoff attempt is successful.

The first step following an unsuccessful hard handoff attempt is to determine if the destination system is available. Received energy accumulator 540 accumulates the total power received in the destination system's frequency band and provides the result to control processor 520. Control processor 520 compares those accumulation results with the threshold MIN_RX_PWR. If MIN_RX_PWR is not exceeded, the handoff attempt is aborted. Receiver 590 and transmitter 560 are retuned to the original frequency and control processor 520 generates a message that notifies base station 300 that the handoff attempt failed and the destination system was not found to be significantly present. The message is provided to modulator 550 which modulates the message and provides the modulated signal through transmitter 560, duplexer 600, and antenna 610 for transmission.

Mobile station 500 contains system preference information stored in system preference table 510. If the destination system is not present, mobile station 500 may send alternate system information to base station 300, so that mobile station 500 may attempt to acquire a different system on the next hard handoff attempt. For example, a neighboring region may be covered by multiple systems, which may include a combination of CDMA systems as well as systems of alternate technologies. System preference table 510 may be programmed such that if a first preferred system is not available, acquisition of a second system is attempted. There may be additional systems upon which to attempt handoff, should the second system be unavailable. Handoff attempts can be made in a prioritized order until acquisition has been attempted on all candidate systems.

If MIN_RX_PWR is exceeded, indicating that the destination system is available, mobile station 500 proceeds as previously instructed. In the exemplary embodiment, searcher 580 conducts a search to locate pilot offsets where base stations in the destination system are available. To perform a search, searcher 580 generates the PN sequence with a specific offset. Demodulator 570 correlates the incoming data with the offset PN sequence. Pilot energy accumulator 530 measures the pilot energy for that offset by accumulating samples for a predetermined time interval. Control processor 520 compares that result to a threshold, called T_ADD, to determine whether a pilot is available for that offset. Searcher 580 then moves to the next offset candidate. The process repeats until there are no more candidate offsets to measure. The search operation process is described in detail in U.S. Pat. No. 5,805,648 entitled "METHOD AND APPARATUS FOR PERFORMING SEARCH ACQUISITION IN A CDMA COMMUNICATION SYSTEM", issued Sep. 8, 1998, which is assigned to the assignee of the present invention and incorporated by reference herein. Alternate search algorithms can be substituted in searcher 580 without modification to the present invention.

The search subsequent to the hard handoff failure may be performed over all possible offsets or a subset thereof. For example, a range of offsets may be searched. In the exemplary embodiment, the OFNLM contains the subset of offsets to be searched. In the exemplary system, neighboring base stations are separated by integer multiples of 64 chips. If one base station offset in the system is known (even if it is not currently available), only offsets that are integer multiples of 64 from that known offset need to be searched in order to attempt acquisition on the complete set of neighbor base stations. A combination of spaced offsets in a specific range or number of ranges can also be searched.

When the destination system is an alternate technology, there may be different procedures to perform which will yield information that will improve subsequent hard handoff attempts. For example, when the destination system is TDMA, the mobile station may measure the in band energy at a plurality of frequency subbands and report this information to the origination system. Or in the case of a neighboring AMPS system, the base station can send an OFNLM specifying frequencies for the analog control channels. However, it may not be necessary to send the frequencies of the control channels if they are already known. In that case, if the mobile station finds the voice channel to which it was handed off is too weak, the mobile station can proceed to measure the received power on the analog control channels. It may also determine the digital color code (DCC) for the control channel. The DCCs provide better determination of the cell in case the mobile station might be able to receive multiple cells in an area. The frequencies and DCCs of the strongest analog base stations can be returned as information to assist with a subsequent handoff attempt. Further discussion of the use of DCCs can be found in chapter 3 of "Mobile Cellular Telecommunications Systems" by William C. Y. Lee.

After mobile station 500 completes the requisite tasks, receiver 590 and transmitter 560 are retuned to the original frequency and control processor 520 notifies base station 300 through modulator 550, transmitter 560, duplexer 600, and antenna 610 that the handoff attempt failed and delivers any information that has been discovered during subsequent system search procedures.

Figure 5:
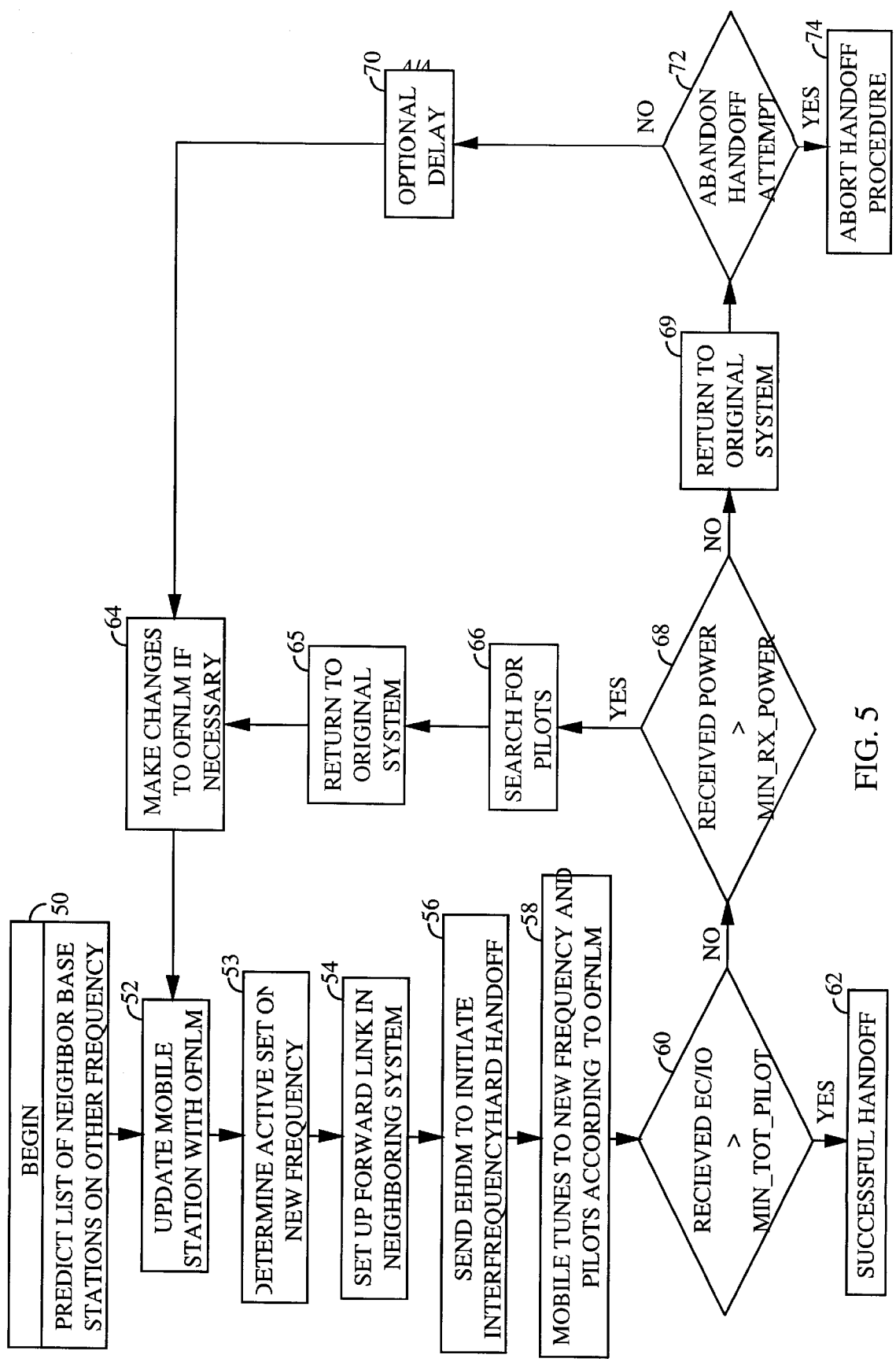
FIG. 5 is a flow chart illustrating the operation of the present invention.

The flow chart in FIG. 5 illustrates operation of the preferred embodiment of this invention. After determining that a handoff is imminent, the origination system predicts the list of neighbor base stations on the neighboring system's frequency in box 50. Proceed to 52, a base station in the origination system sends to the mobile station the Other Frequency Neighbor List Message (OFNLM) described above. In block 53, the Active Set for the new frequency is determined. In block 54, the destination system sets up the forward link as specified in the Extended Handoff Direction Message (EHDM). In block 56, the base station in the origination system sends the Extended Handoff Direction Message (EHDM) to the mobile station to initiate the inter-frequency hard handoff. Following that message, in 58, the mobile station tunes to the new frequency and attempts to acquire the destination system according to the Active Set information in the EHDM message.

In block 60, the mobile station measures the pilot energy, the sum of the energy of all pilots in the Active Set, and if the received total pilot energy exceeds that of parameter MIN_TOT_PILOT, proceed to 62, a successful hard handoff has occurred. The exemplary embodiment envisions that a mobile station is capable of being handed off directly into a soft handoff condition in the destination system, although that is not a requirement. A single pilot in the new Active Set whose received pilot energy exceeds that of parameter MIN_TOT_PILOT is sufficient for a successful handoff.

From 60, if MIN_TOT_PILOT is not exceeded, proceed to 68. In 68, if total received power in the frequency band exceeds parameter MIN_RX_PWR indicating the general presence of the destination system, proceed to 66, otherwise go to 69.

An alternative embodiment would be to check total received power before pilot energy. If the MIN_RX_PWR threshold is not exceeded, the handoff is aborted. This may be faster in some implementations.

In 66, search the possible offsets for available pilot signals. Any alternate search strategy can be performed here as well. When search is complete, proceed to 65. The mobile station returns to the original system in 65, then proceeds to 64. In 64, make necessary changes to OFNLM and return to 52, where the operation proceeds as described above.

In 69, the mobile station returns to the original system, then proceeds to 72. From 72, the decision can be made to continue attempting handoff by proceeding to 70, or the handoff procedure can be aborted by proceeding to 74. An optional delay is introduced in 70, then proceed to 64.

In an alternative embodiment of the present invention, the base station sends the mobile station an extended list of base stations which may be available at the point in which the mobile station is entering the destination system. In this alternative embodiment, no forward links are immediately set up in the destination system. Rather the mobile station simply determines whether the strength of any of the signals provided by any of the extended list of candidate systems are adequate to support a communication link. The mobile station monitors the forward link signals of each of the base stations in the extended list of candidate base stations.

After monitoring the signal strength of each of base stations in the extended list of candidate base stations, the mobile station necessarily returns to the original system and sends a message indicating the signal strength of the forward links of the candidate base stations. In the exemplary embodiment, the mobile station compares the strength of the signals received by each of the base stations in the extended list to a predetermined threshold T_ADD and reports only whether the measured signal power is above or below the threshold.

The base station of the original system receives the information regarding the signal strength of each of the base stations in the destination system and from this information the base station of the original system generates an Active Set list. This list is provided to the destination system which sets up forward links for the mobile station in accordance with the Active Set list provided by the original system. The base station of the original system transmits the active list to the mobile station which attempts to acquire the base stations in the active list and, if acquisition is successful, transmission to the mobile station is available without interruption.

Referring to FIG. 2, the alternative embodiment will be described in terms of acquisition of mobile M3. When original system S1 determines that mobile M3 should begin hard hand off operations to destination system S2, the base station in original system S1 which is currently in communication with mobile station M3 generates an extended list of base stations in S2 which the mobile station may be able to acquire. In the exemplary embodiment, the extended candidate list would likely consists of the parameters necessary to perform a search on all of base stations B1, B2, B3, B4 and B5, as well as additional base stations in destination system S2 (not shown). Note in the alternative embodiment, no information regarding M3 has, as of yet, been provided to the destination system S2.

Mobile station M3 tunes to the frequency of destination system S2 and measures the energy on each of the pilot channels of the base stations in the extended candidate list. In the example of mobile station M3, the mobile station would transmit back a message to the base station on the original system S1 a message indicating that acquisition upon base station B5 was possible. In response to this message, the base station in the original system would generate an Active Set list consisting solely of base station B5.

The base station in the original system would send a message to the destination system S2, indicating that a forward link for the mobile station M3 should be provide on base station B5. In response to this message, the destination system S2 sets up a forward link for mobile station M3 on base station B5. The Active Set list is sent to mobile station M3. In response to the Active Set message, mobile station M3 attempts acquisition of base station B5.

Referring to FIG. 3, base station 300 of the original system generates an extended candidate list in message generator 320 and provides the message to modulator 330. The message is modulated by modulator 330 and provided to transmitter 340 which upconverts and amplifies the signal and transmits the resulting signal through antenna 350.

Referring to FIG. 4, the transmitted signal is received by mobile station 500 by antenna 610 and is downconverted, filtered and amplified by receiver 590. The received signal is then demodulated by demodulator 570 and provided to control processor 520. Control processor 520 then generates a set of commands directing a search to be performed by searcher 580. Searcher 580 provides a set of search demodulation parameters to demodulator 570. The demodulated signals are provided to pilot energy accumulator 530 which measures the strength of the pilots of the base stations of the extended candidate list. The energy of each of these candidates is provided to control processor 520 which compares the measured energy with a threshold T_ADD. Control processor 520 generates a message which signifies which, if any, of the candidate base station's signals exceed the threshold.

The message is provided to modulator 550 where it is modulated. The modulated signal is then provided to transmitter 560 where it is upconverted, amplified, and transmitted through antenna 610.

Referring back to FIG. 3, the message indicating the strengths of the candidate base stations is received by antenna 390 of base station 300 of the original system. The signal is downconverted and amplified by receiver 380 and provided to demodulator 370. Demodulator 370 demodulates the signal and provides the result to control processor 360. Control processor 360 generates an Active Set list for the destination system in accordance with the information in the message transmitted by mobile station 500 indicating the results of its search. In the exemplary embodiment, the Active Set list will consist of all base stations whose signals, when monitored by mobile station 500, exceeded the energy threshold T_ADD.

Control processor 360 sends the Active Set list to system interface 310 which sends a message indicating the Active Set list to the destination system S2. Capacity issues allowing, destination system S2 provides forward link channels on each of the systems in the Active Set list.

Control processor 360 also provides the Active Set list to message generator 320. The resulting message is modulated by modulator 330 and transmitted as described above.

Mobile station 500 receives the message by antenna 610, demodulates the signal as described above, and provides the message to control processor 520. Control processor 520 then provides information regarding the Active Set list to demodulator 570 and receiver 590 and a hard handoff to the destination system S2 is attempted using the parameters of the base stations in the Active Set list. It should be noted that because, in this example, the active list was determined by mobile station 500, the mobile station need not receive the Active Set list, since it knows the station on the list apriori. Thus, in an alternative, embodiment, the mobile station may delay a predetermined time period and perform handoff to the base stations who's signals exceeded the threshold. If, on the other hand, the Active Set is not simply a copy of the base stations which exceeded the threshold but rather also takes into account parameters unknown to the mobile station, such as capacity parameters of S2, then transmission of the message would prove of value.

In a variation on the above described alternative embodiment, the mobile station periodically tunes to the new frequency and measures the offsets supplied in the OFNLM without direction from the base station. The period may be specified in the OFNLM. After the search is complete, the mobile station returns to the origination system and reports its findings. This information gained by polling the neighboring system can be used to determine the Active Set for a subsequent handoff attempt, as well as to assist in determining whether to initiate a handoff to that system.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. In a wireless communication system wherein a mobile station is moving from the coverage area of an origination system operating at a first frequency into the coverage area of a destination system operating at a second frequency, a method for providing handoff from said origination system to said destination system, the method comprising:

predicting at least one PN offset associated with the destination system;

transmitting, at the first frequency, from said origination system to said mobile station a set of search parameter data associated with the at least one PN offset;

determining at said mobile station the availability of said destination system in accordance with said set of search parameter data;

transmitting from said mobile station to said origination system a message indicative of the received strength of signals associated with the at least one PN offset measured at the mobile station;

generating at said origination system a set of acquisition parameters in accordance with said message from said mobile station; and attempting at said mobile station to acquire said destination system in accordance with said set of acquisition parameters.

2. The method of claim 1, wherein said generating further comprises electing at said origination system a new set of at least one PN offset associated with the destination system.

3. The method of claim 1, wherein said attempting further comprises electing at said mobile station a new set of at least one PN offset associated with the destination system.

4. A method of providing handoff of a mobile station from an origination system operating at a first frequency to a destination system operating at a second frequency, comprising:

receiving from the origination system at least one PN offset associated with the destination system and a minimum total received pilot value;

tuning, at the mobile station, to the second frequency;

determining a pilot energy associated with the at least one PN offset received at the mobile station;

comparing the determined pilot energy with the minimum total received pilot value; and sending, from the mobile station to the origination system, a message based on said comparing.

5. The method of claim 4 wherein said message comprises said determined pilot energy.

6. The method of claim 4 wherein said receiving further comprises receiving from the origination system a set of additional parameters comprising instructions to the mobile station following a failed hard handoff attempt.

7. The method of claim 6 wherein said sending is based on said instructions.

8. The method of claim 4 further comprising performing a search at the second frequency based on said comparing.

9. The method of claim 8 wherein said performing a search is based on said instructions.

10. A method of providing handoff of a mobile station from an origination system operating at a first frequency to a destination system operating at a second frequency, comprising:

receiving from the origination system at least one PN offset associated with the destination system and a received power threshold;

tuning, at the mobile station, to the second frequency;

determining a pilot energy associated with the at least one PN offset received at the mobile station;

measuring in-band energy received by the mobile station at the second frequency;

comparing the measured in-band energy with the received power threshold; and sending, from the mobile station to the origination system, a message based on said comparing.

11. The method of claim 10 wherein said message comprises said measured in-band energy.

12. The method of claim 10 wherein said receiving further comprises receiving from the origination system a set of additional parameters comprising instructions to the mobile station following a failed hard handoff attempt.

13. The method of claim 12 wherein said sending is based on said instructions.

14. The method of claim 10 further comprising performing a search at the second frequency based on said comparing.

15. The method of claim 14 wherein said performing a search is based on said instructions.

16. A method of providing handoff of a mobile station from an origination system operating at a first frequency to a destination system operating at a second frequency, comprising:

sending from the origination system to the mobile station at least one PN offset associated with the destination system and a minimum total received pilot value;

sending from the origination system to the mobile station a message directing the mobile station to perform a hard handoff to the destination system;

receiving at the origination system from the mobile station a message based on a total received pilot value measured by the mobile station at the second frequency; and sending to the mobile station at least one adjusted PN offset having a different value than said at least one PN offset based on said message.

17. The method of claim 16 wherein said sending to the mobile station further comprises sending to the mobile station a set of additional parameters comprising instructions to the mobile station following a failed hard handoff attempt.

18. The method of claim 16 wherein said message further comprises measurements from a search performed at the second frequency.

19. A method of providing handoff of a mobile station from an origination system operating at a first frequency to a destination system operating at a second frequency, comprising:

sending from the origination system to the mobile station at least one PN offset associated with the destination system and a received power threshold;

sending from the origination system to the mobile station a message directing the mobile station to perform a hard handoff to the destination system;

receiving at the origination system from the mobile station a message based on a received power measured by the mobile station at the second frequency; and sending to the mobile station at least one adjusted PN offset having a different value than said at least one PN offset based on said message.

20. The method of claim 19 wherein said sending to the mobile station further comprises sending to the mobile station a set of additional parameters comprising instructions to the mobile station following a failed hard handoff attempt.

21. The method of claim 19 wherein said message further comprises measurements from a search performed at the second frequency.

22. A mobile station apparatus comprising:

a receiver configured to tune to one of at least two system frequencies based on a frequency control signal; and a control processor configured to generate the frequency control signal directing said receiver to tune to a first frequency associated with an origination system, to receive from the origination system at a first frequency at least one PN offset associated with a destination system and a minimum total received pilot value, to direct said receiver to tune to a second frequency associated with the destination system, to compare a pilot energy measured at the second frequency with the minimum total received pilot value to generate a comparison, to direct said receiver to tune back to the first frequency based on the comparison, and to generate a message for the origination system based on the comparison.

23. The mobile station apparatus of claim 22 wherein said message comprises the pilot energy measured at the second frequency.

24. The mobile station apparatus of claim 22 wherein said control processor is further configured to receive from the origination system a set of additional parameters comprising instructions to the mobile station following a failed hard handoff attempt.

25. The mobile station apparatus of claim 24 further comprising a searcher configured to perform a search at the second frequency based on commands from said control processor, and wherein said control processor directs said searcher to perform the search based on the instructions.

26. A mobile station apparatus comprising:

a receiver configured to tune to one of at least two system frequencies based on a frequency control signal; and a control processor configured to generate the frequency control signal directing said receiver to tune to a first frequency associated with an origination system, to receive from the origination system at a first frequency at least one PN offset associated with a destination system and a received power threshold, to direct said receiver to tune to a second frequency associated with the destination system, to compare a received power measured at the second frequency with the received power threshold to generate a comparison, to direct said receiver to tune back to the first frequency based on the comparison, and to generate a message for the origination system based on the comparison.

27. The mobile station apparatus of claim 26 wherein said message comprises the received power measured at the second frequency.

28. The mobile station apparatus of claim 26 wherein said control processor is further configured to receive from the origination system a set of additional parameters comprising instructions to the mobile station following a failed hard handoff attempt.

29. The mobile station apparatus of claim 28 further comprising a searcher configured to perform a search at the second frequency based on commands from said control processor, and wherein said control processor directs said searcher to perform the search based on the instructions.

* * * * *